United States Patent [19]

Demonte et al.

[11] 3,715,724

[45] Feb. 6, 1973

[54] APPARATUS FOR RECOGNIZING GRAPHIC SYMBOLS

[75] Inventors: Filippo Demonte, Borgofranco D'Ivrea; Luciano Pipino, Ivrea, both of Italy

[73] Assignee: Ing. C. Olivetti & C.S.p.A., Ivrea (Turin), Italy

[22] Filed: Dec. 10, 1970

[21] Appl. No.: 96,931

[30] Foreign Application Priority Data

Dec. 24, 1969 Italy ............................54500 A/69

[52] U.S. Cl. ....................................340/146.3 AG

[51] Int. Cl. .............................................G06k 9/00

[58] Field of Search...................................340/146.3

[56] References Cited

UNITED STATES PATENTS

| | | | |
|---|---|---|---|
| 3,457,552 | 7/1969 | Asendorf | 340/146.3 T |
| 3,234,513 | 2/1966 | Brust | 340/146.3 AG |
| 3,582,887 | 6/1971 | Guthrie | 340/146.3 AG |
| 3,104,372 | 9/1963 | Rabinow et al. | 340/146.3 AG |

*Primary Examiner*—Maynard R. Wilbur
*Assistant Examiner*—Joseph M. Thesz, Jr.
*Attorney*—Birch, Swindler, McKie & Beckett

[57] ABSTRACT

An optical character recognition device is disclosed wherein a character is scanned by a cathode ray tube along a plurality of parallel scan lines and a photo-detector derives an analogue electrical signal proportional to the intensity of the light signal output from each scanned point. The derived analogue signals are compared with a plurality of threshold values, and an optimum threshold is selected. The resulting digital signal is then compared with pre-established graphic signals to provide a recognition symbol identifying the character. Means are also provided to command a re-examination of an unrecognized signal by selecting a different threshold value. A logical filter apparatus is also provided to operate on the binary value assigned to the point under examination and the surrounding points and to assign to the examined point a binary signal level depending at least in part on the signal levels of the surrounding points. This logic filter circuit also includes means for detecting end points in lines and for detecting and eliminating break points in lines by comparing signal bits corresponding to the points surrounding the point examined to a pre-established set of conditions.

10 Claims, 9 Drawing Figures

INVENTORS
FILIPPO DEMONTE
LUCIANO PIPINO

*INVENTORS*
FILIPPO DEMONTE
LUCIANO PIPINO

INVENTORS
FILIPPO DEMONTE
LUCIANO PIPINO

INVENTORS
FILIPPO DEMONTE
LUCIANO PIPINO

INVENTORS
FILIPPO DEMONTE
LUCIANO PIPINO

BY

ATTORNEYS

APPARATUS FOR RECOGNIZING GRAPHIC SYMBOLS

The present invention relates to apparatus for recognizing graphic symbols comprising means adapted to scan each symbol with a succession of substantially parallel scans to derive an electrical signal which is a function of the symbol density, and means adapted to process the electrical signal for the purpose of establishing a correspondence between each symbol examined and one of a set of predetermined graphic symbols and to supply a recognition-effected signal at the end of the examination and recognition of a symbol.

The term symbol density is used to denote the point to point density of the symbol in terms of the quantity to which the scanning means responds. Thus it may be optical density or it may be determined by the density of a magnetic ink for example.

In the most common systems for recognition of symbols (for the most part alphanumeric characters) a document is scanned by means of a transducer which supplies an electrical signal of analogue type which is a function of the symbol density. For example, in an optical recognition system, the characters are scanned by means of an optical device which supplies an electrical signal proportional to the optical density of the scanned zone. The analogue electrical signal obtained in this way is then rendered binary by causing it to pass through a quantizer; this supplies a signal of a level indicated conventionally by "1" when the analogue signal exceeds a suitably determined threshold value, while it supplies a signal of a level indicated by "0" when the analogue signal is below the threshold. For example, in the case of optical recognition, the threshold will correspond to a suitable tone of grey, so that more intense tones of grey will be regarded as black and will give rise to a "1" signal, while less intense tones of grey will be regarded as white and will give rise to a "0" signal. The binary signal produced in this way is then processed in known manner to effect recognition of the character.

The symbol density of a character stroke is usually anything but uniform. For instance, a stroke of a printed character viewed greatly magnified would appear as composed of more or less black areas enveloping white spots. Moreover, the density of printing decreases from the center to the edges of the strokes.

The problem of the choice of the threshold used to convert the analogue signal to binary form is consequently a delicate one. We continue to discuss the optical recognition of characters, it being understood that the discussion is also valid for other types of recognition. If a high threshold is chosen, the apparatus will regard as black only those points of the character which are intensely black. Consequently, the analogue signal resulting from the scanning of a stroke of the character will correspond to a line thinner than what appears to the eye. Some thin portions of the character may quite vanish. (in effect, it would be strictly appropriate to speak of "thickness" only in the case of a line of a uniform black, but for simplicity we will continue to speak of "thickness" also in the case of a line of grained structure). If, on the other hand, a low threshold is chosen, the grey blur at the edges will also be included in the lines forming the character. The analogue signal resulting from the examination of the character will therefore correspond to a stroke thicker than what appears to the eye; therefore, in the image of the character supplied by the transducer, a number of characteristic features of the character, such as a white area surrounded by blacks, etc., may be little evident or disappear entirely. In both cases there will be a risk of rendering the character unrecognizable by the recognition processor. Moreover, the threshold value must be chosen in dependence upon the quality of the print and the type of paper or other support on which the characters are formed.

In known apparatus, the threshold is usually adjusted on the basis of the quality of the print and of the paper at the first character to be examined. In this way, there is the disadvantage that if the quality of the print or of the paper varies in a following character the threshold is no longer adjusted to a suitable value. In other known arrangements, the threshold is adjusted automatically for a character on the basis of the average density of the strokes forming the preceding character. If this average value deviates from a standard value, the threshold is adjusted accordingly. In the case of a character with a portion thicker than the average, for example because of an ink smudge, this arrangement would adjust the threshold to a value such as to thin down excessively a stroke less dark than the rest for the purpose of maintaining the thickness averagely constant, but thereby jeopardizing recognition of the character.

Another problem is that of the elimination of the irregularities due to imperfect definition of the contour of the character, the presence of white spots within a line, the presence of black spots around the character, etc. This problem is usually solved by utilizing two-dimensional logical filters which decide whether an electrical signal of a value corresponding to a white or black point must actually be regarded as such by calculating a well-balanced average of the state (white or black) of the points surrounding the one examined. This method, however, is rather rigid, inasmuch as it examines only an aggregate state of the surrounding points.

The object of the present invention is to provide an symbol recognition apparatus which deduces for each symbol what should be the best threshold, from among a plurality of available thresholds, to be used for quantizing the analogue signal deriving from the scanning of that symbol so as to render recognition thereof possible.

According to the present invention in one aspect there is provided apparatus for recognizing graphic symbols formed from lines comprising means adapted to scan each symbol with a succession of substantially parallel scans to derive an electrical signal which is a function of the symbol density, and means adapted to process the electrical signal for the purpose of establishing a correspondence between each symbol examined and one of a set of predetermined graphic symbols and to supply a recognition-effected signal at the end of the examination and recognition of a symbol, the apparatus further comprising first means adapted to produce at least two digital signals from the analogue signal by quantizing it with as many thresholds of different values; second means adapted to indicate for each symbol examined the best thresholds corresponding to a maximum number of portions of the lines forming the symbol having a thickness approximating to the average thickness for the type of symbols examined; third means adapted to select for recognition one of the digital signals derived from a symbol in correspondence with a best threshold indicated for the previously recognized symbol; and fourth means controlled by the means which supply the recognition-effected signal and adapted to command a reexamination of an unrecognized symbol by selecting one of the digital signals corresponding to a best threshold indicated for the previous scan of the symbol. Another object of the invention is to provide apparatus with a logical filter which reduces the possibility of errors in the assignment of a corresponding level to a point of the symbol by assigning to each point of an image a binary level depending on the simultaneous verification of a set of conditions for the surrounding points. According to the invention in another aspect there is provided apparatus for eliminating spurious interruptions from a matrix of bit signals representing an image, comprising a logic circuit which associates with a bit of the matrix corresponding to a point of the image a bit with a value depending on the simultaneous verification of a set of conditions for the bit signals corresponding to the surrounding points, each of the conditions being included in a corresponding class of conditions indicating the presence of bits of equal value in a given area encompassing the bit in question.

The following description presents a preferred embodiment and is given, by way of example, with the aid of the accompanying drawings, in which:

FIG. 1 is a block diagram of the apparatus embodying the invention;

FIG. 2*a*, *b*, *c* are diagrams demonstrating procedures utilized by the apparatus;

Figure 1:
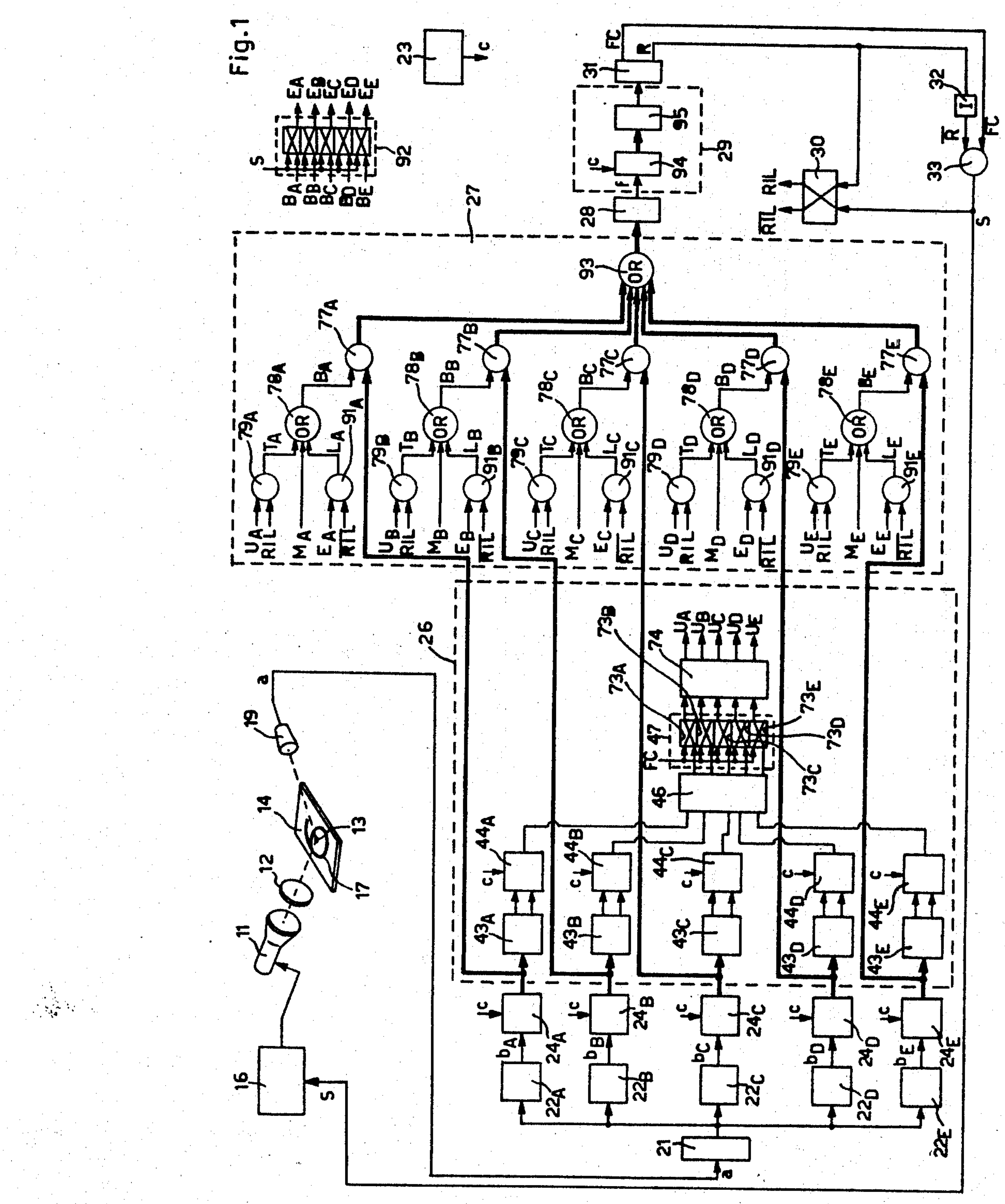

In FIG. 1, a thin stroke indicates a conductor which carries an analogue signal or a binary signal of one bit of information, while a thick stroke indicates a line which carries more than one bit of information, that is the assembly of a plurality of conductors. Thus, a summing or logical product circuit into which there enters a line indicated by a thick stroke should also in reality be understood as multiplied into as many similar circuits as there are conductors forming the line.

The embodiment considered is that of an apparatus for processing preliminary to the optical recognition of characters in respect of which the range within which the average thickness of the lines varies is known beforehand. A cathode ray tube 11 (FIG. 1) sends a light spot 13 through a focusing system 12 on to a document 14 to be examined. The position of the spot is controlled by means of a scanning circuit 16 which operates on a preestablished program so as to examine each character 17 by successive parallel scans. The spot 13 produces an amount of light diffused by the document to a greater or lesser degree according to whether it encounters a light zone or a dark zone. The diffused light is picked up by a photodetector 19 which supplies an analogue electrical signal *a* substantially proportional to the intensity of the light signal input.

The analogue signal *a* is amplified by an amplifier 21 and is thereafter compared in five quantizing circuits 22A to 22E with an equal number of thresholds of different values, in manner known per se. The thresholds of the circuits 22A to 22E are of increasing value in the order extending from A to E. At the output of each of the circuits 22A to 22E there is collected a binary signal *b*A to *b*E having a high level, corresponding to the value 1 of the binary variable, when the analogue signal *a* is above the threshold, and having a low level corresponding to the value 0 of the binary variable, when the signal *a* is below the threshold.

The circuits 22A to 22E also provide for standardizing the signals bA to bE in duration in manner known per se, so that the successive periods of a scan correspond to multiples of the period of a synchronizing signal *c* having a frequency of 2 MHz. The synchronizing signal *c* is generated by a timing circuit 23.

Each of the signals bA to bE will correspond, on the basis of what has been said hereinbefore, to a character 17 formed of strokes thickened to a greater or lesser degree according to the value of the threshold used in the corresponding quantizer 22A to 22E. Each of the signals bA to bE passes to a corresponding register 24A to 24E which staticizes little by little a portion thereof corresponding to an area encompassing points of the character. The five registers 24A to 24E are connected to a network 26 which processes the contents thereof for the purpose of indicating which among the signals *b*A to *b*E correspond to a character 17 in which the thickness of the strokes is close to that of the type of characters to be recognized. The registers 24A to 24E are furthermore connected to a network 27 which selects one thereof to connect it to a first logical filter 28. The output of the first logical filter 28 passes to a second logical filter 29 and then to a recognition processor 31. This supplies an end-of-character signal FC at the end of the final scan of each character and a recognition signal R when it succeeds in establishing a correspondence between the character examined and one of the possible alphanumeric characters. The signal FC and the signal $\overline{R}$, obtained by inverting R by means of the inverter 32, constitute the input of a logical product circuit 33, the output S of which goes to the scanning circuit 16. The signal S and the signal R are applied to the SET and RESET inputs, respectively, of a flip-flop 30, the two outputs of which, the SET and RESET outputs, are indicated by the references RIL and $\overline{RIL}$, respectively.

There will now be given a theoretical description of the procedure utilized by the apparatus for calculating the best threshold, among those available, with which to quantize the analogue signal *a* corresponding to the character. For each binary signal *b*A to *b*E there is calculated the thickness of the strokes of an ideal character constituted by white or black points, without intermediate gradations, which corresponds to each signal *b*A to *b*E. Let us consider, for example a vertical line five scans wide and N points high (FIG. 2*a*). By "-point" in a scan there is meant a character segment scanned between two consecutive synchronizing pulses $c$. The period of the synchronizing pulses being equal to 0.5 ms and the scanning rate of the television tube 11 being equal to 200 m/sec, a "point" will be 1/10 mm long. The distance between two successive scans is 1/10 mm, so that the thickness of the printed line corresponding to that of FIG. 2*a*, as seen by the transducer, will be 0.5 mm.

Figure 2B:
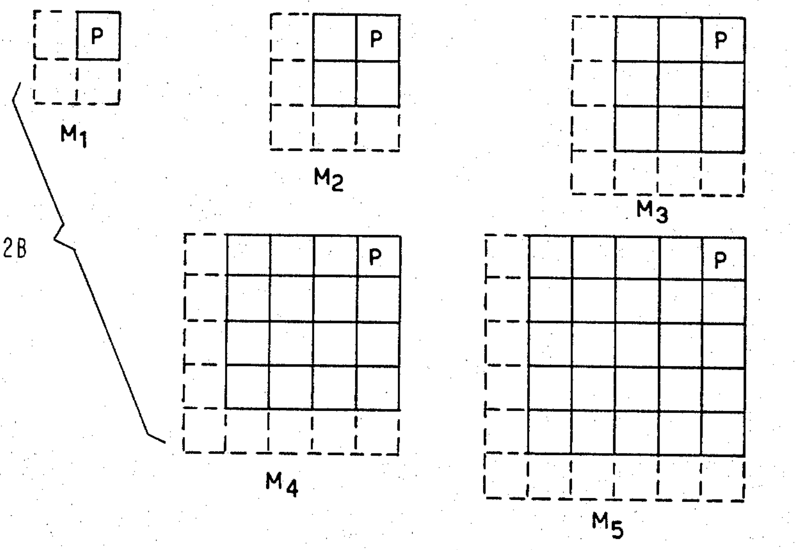
Figure 2A:
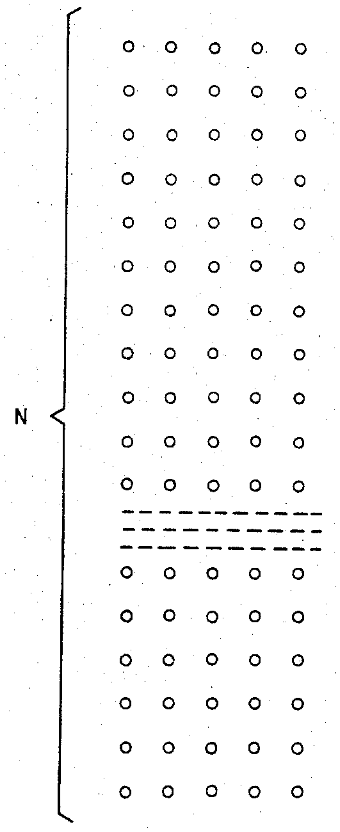

Let us moreover consider the five matrices M1 to M5 of FIG. 2*b*, the point P of which is called the "pivot". A point of the character is indicated by the symbol $Pq$ ($q = 1 \ldots 5$) if, on superimposing the matrix $Mq$ on the character in such manner that the point coincides with the pivot P of the matrix, the following two conditions are satisfied:

a. all the points inside the matrix outlined by a solid line are black;

b. at least one point inside the matrix shown in dashes is white.

Figure 2C:
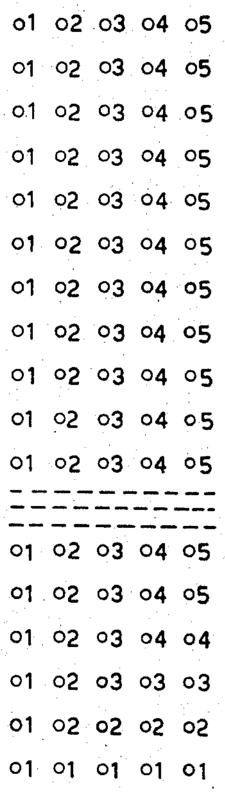

FIG. 2*c* again shows the line of FIG. 2*a*, in which, beside each point, there is indicated the ranking which corresponds to it in accordance with the procedure described.

Because of the correspondence seen hereinbefore between the thickness of the printed character in a certain stroke and the number of black scans in the same portion, there may be defined as the thickness of a line portion the number of black scans for which the line lasts in that portion. From an examination of FIG. 2*c* it can be verified that, to a good approximation, the following equations (I) are valid, these supply, as a function of $Pq$, the number $N_{Tq}$ of portions of thickness $q$.

$$\begin{aligned} N_{T1} &\cong \Sigma P1 - \Sigma P2 \\ N_{T2} &\cong \Sigma P2 - \Sigma P3 \\ N_{T3} &\cong \Sigma P3 - \Sigma P4 \\ N_{T4} &\cong \Sigma P4 - \Sigma P5 \\ N_{T5} &\cong \Sigma P5 \end{aligned} \qquad (I)$$

In the case of the character constituted by a vertical line, for example, the following Equations (II) and (III) are verified:

$$\begin{aligned} \Sigma P1 &= N+4 \\ \Sigma P2 &= ]N+2 \\ \Sigma P3 &= N \\ \Sigma P4 &= N-2 \\ \Sigma P5 &= N-4 \end{aligned} \qquad (II)$$

$$\begin{aligned} N_{T1} &= 0 \cong \Sigma P1 - \Sigma P2 = 2 \\ N_{T2} &= 0 \cong \Sigma P2 - \Sigma P3 = 2 \\ N_{T3} &= 0 \cong \Sigma P3 - \Sigma P4 = 2 \\ N_{T4} &= 0 \cong \Sigma P4 - \Sigma P5 = 2 \\ N_{T5} &= N \cong \Sigma P5 = N-4 \end{aligned} \qquad (III)$$

It is easy to gather that the approximate Equations (III) are all the more true the larger N is.

Let us assume that for the type of characters recognized in the example being examined the thickness of the lines constituting the characters is between 0.2. and 0.4 mm; with a scanning density of 10 scans/mm, this corresponds to a thickness of from two to four scans. It can therefore be said that the ideal threshold with which to render binary the analogue signal corresponding to a character is that which renders the number of portions of a thickness between two and four scans the maximum, that is a threshold which renders $N_{T2} + N_{T3} + N_{T4}$ the maximum.

But from the Equations (I) we have the following Equation (IV):

$$N_{T2} + N_{T3} + N_{T4} \cong \Sigma P2 - \Sigma P5 \qquad (IV)$$

Therefore, the ideal threshold is that which renders $\Sigma P2 - \Sigma P5$ maximum. It should be observed that for very thick characters $\Sigma P2 - \Sigma P5 < 0$.

Examination of the block diagram of the apparatuses (FIG. 1) will now be resumed in order to see how the procedure described is carried into practice.

Figure 3:
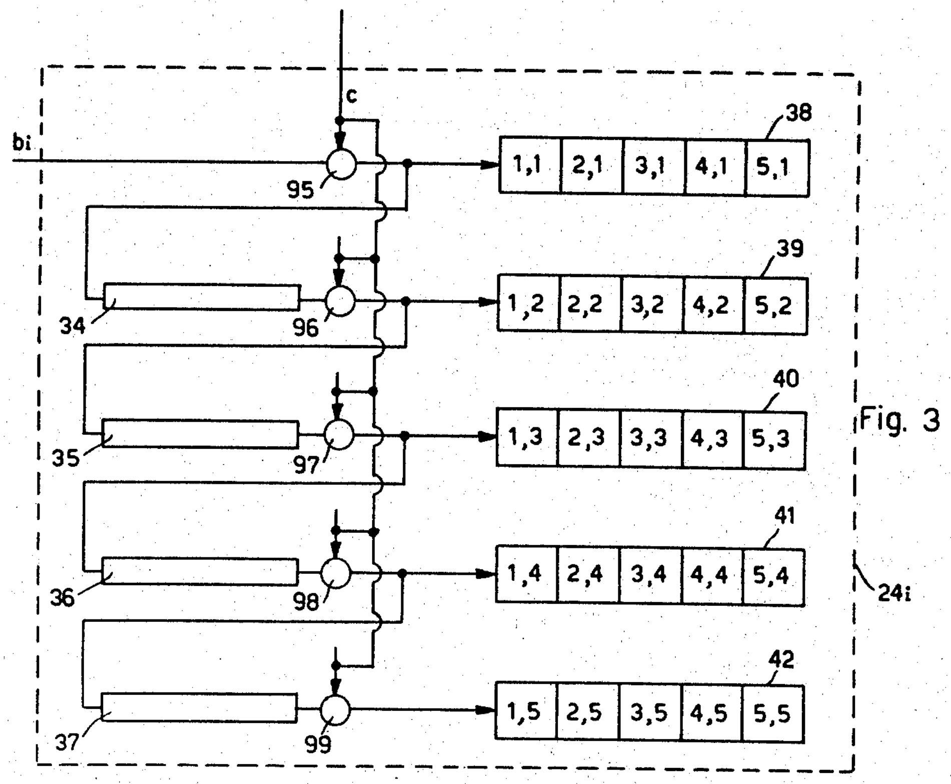
FIG. 3 is a detail of the block diagram of FIG. 1.

Each of the binary signals $b$A to $b$E is sampled and staticized in the registers 24A to 24E. Each register **24*i* (FIG. 3) is composed of four delay lines 34 to 37 having a delay equal to the duration of the scanning of a line, and five shift registers 38 to 42 each constituted by five flip-flops U, V (U = 1 to 5, V = 1 to 5) which are connected. The connection between the input of the delay line 34 and the shift register 38 and the connection between the outputs of the delay lines 34 to 37 and the corresponding shift registers 39 to 42 are made through the medium of five corresponding AND gates 95 to 99** which are opened by the synchronizing pulse $c$. Let us again consider a line having 5 × N points as in FIG. 2*a*; let it be assumed that this line is as long as a full scan and that the first scan corresponds to the first column of points of the line. Let us consider the instant when the signal $bi$ corresponding to the first scan appears at the shift register 38, simultaneously with a synchronizing pulse $c$ which opens the gates 95 to 99. In the cell 1, 1 of the register 38 there will be stored a bit with a value corresponding to the value of the signal $bi$ at the instant when the synchronizing pulse $c$ has occurred. On the following synchronizing pulse $c$, the contents of the flip-flop 1, 1 pass into the flip-flop 2, 1, while a bit corresponding to the second point of the first scan is stored in the flip-flop 1, 1, and so on. On the N-th synchronizing pulse $c$, the register 38 will contain the last five points of the first scan, the point N in the flip-flop 5, 1 and the point N − 5 in the flip-flop 1, 1. On the (N+1)-th synchronizing pulse $c$, the first point of the first scan will appear at the output of the delay line 34 and will be stored in the flip-flop 1, 2 of the shift register 39, the first point of the second scan will be stored in the flip-flop 1, 1 and the Nth to (N−3)rd points of the first scan will pass to the flip-flops 2, 1 to 5, 1 of the register 38. On the (4N+5)th synchronizing pulse, the flip-flops 5, 5 to 1, 5 of the register 42 will contain the first to the fifth points of the first scan, the flip-flops 5, 4 to 1, 4 of the register 41 will contain the first to the fifth points of the second scan, . . . , the flip-flops 5, 1 to 1, 1 of the register 38 will contain the first to the fifth points of the fifth scan. At each successive synchronizing pulse the contents of the registers 38 to 40 will shift so as to cover little by little all the possible square matrices with a 5-point side contained in the character in question.

The contents of the flip-flops (U, V) A to E which constitute the registers 24A to 24E are processed by the logic circuits 43A to 43E (FIG. 1) to obtain P2 and P5 in accordance with the definitions given hereinbefore. If we indicate the contents of the flip-flops *i, j* of the registers 38 to 40 as *aij*, the following Equations (V) and (VI) are valid:

$$(P2{=}5{,}4 \cdot a\,4{,}5 \cdot a4{,}4 \cdot a5{,}5\ (a5{,}3 \cdot a4{,}3 \cdot a3{,}3 \cdot a3{,}4 \cdot a3{,}5) \qquad (V)$$

$$P5 = {}^{5}\text{AND}_{u,v=1}\, a_{u,v} \qquad (VI)$$

in which the symbol ${}^{5}\text{AND}_{u,v=1}\, a_{u,v}$ represents the logical product of the terms *a*U,V in which U and V vary from 1 to 5. The equation (V) corresponds to the condition that the flip-flops 5,4; 5,5; 4,4; 4,5 all contain the bit 1 and that at least one among the flip-flops 5,3; 4,3; 3,3; 3,4; 3,5 contain the bit O, in accordance with the procedure hereinbefore described. The equation (VI) corresponds to the condition that all the flip-flops U, V (U = 1 to 5, V = 1 to 5) of the shift registers 38 to 42 contain the bit 1, also in accordance with the procedure hereinbefore described. The logic circuits 43A to 43E which supply P2 and P5 can be produced immediately by an average expert on the basis of Equations (V) and (VI) a diagram thereof is therefore not shown.

The outputs of the logic circuits 43A to 43E which calculate P2 and P5 for each signal *b*A to *b*E are applied to corresponding reversible counters 44A to 44E which counts the bits of P2 forward and the bits of P5 backward, so that the contents thereof at a given instant are $\Sigma$P2 – $\Sigma$P5 (FIG. 1).

The outputs of the counters 44A to 44E go to a majority network 46 which calculates the major one (or possibly the major ones) among them and controls a network of best threshold indicators 47 which indicate for which of the signals *bA* to *bE* $\Sigma$P2 – $\Sigma$P5 is maximum.

Figure 5:
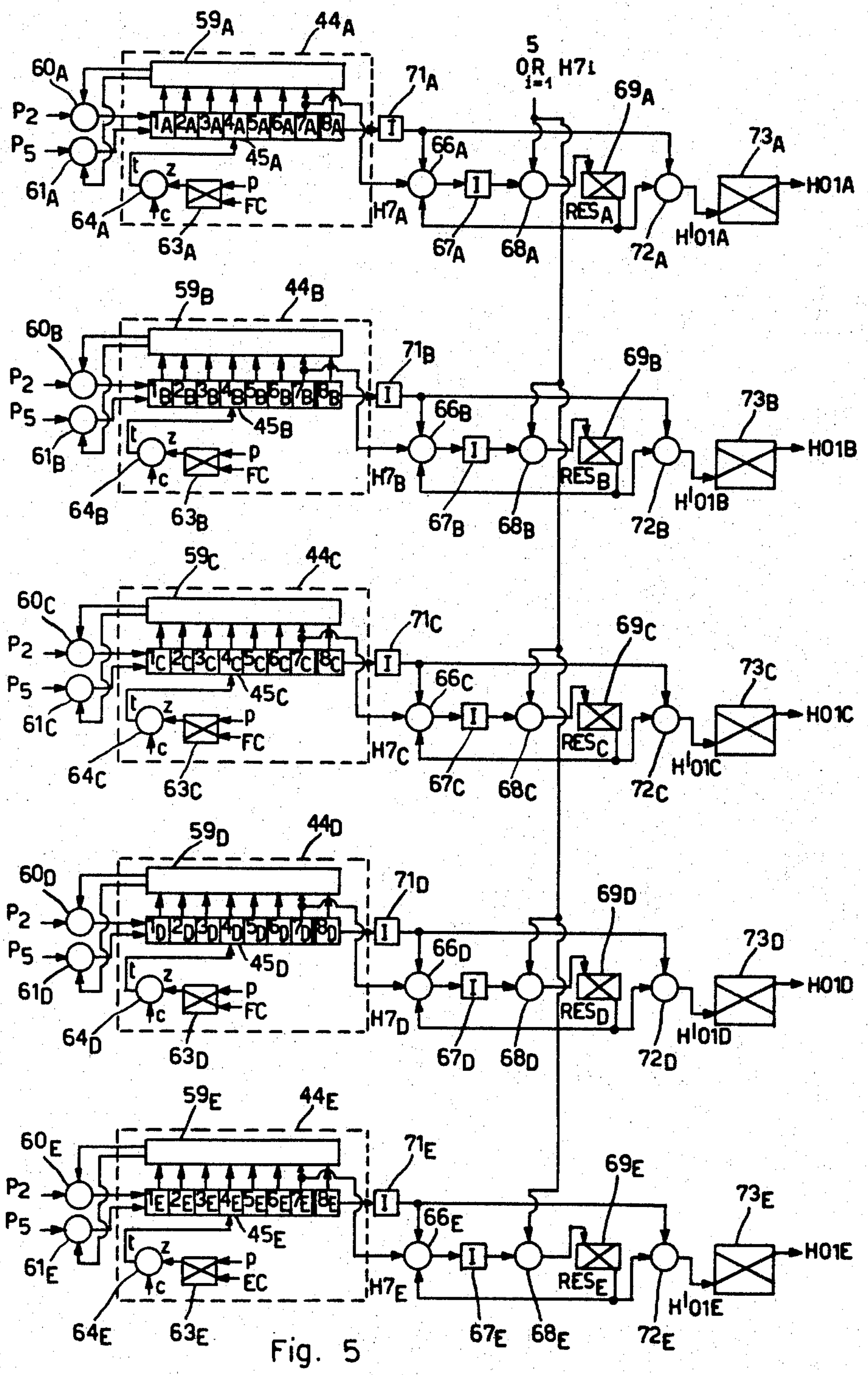
FIG. 5 is another detail of FIG. 1.

FIG. 5 is a detailed block diagram of the reversible counters 44A to 44E, the majority network 46 and the best threshold indicators 47. Each counter 44*i* is constituted by eight stages 1*i* to 8*i* (*i* = A to E) The least significant bit is contained in stage 1*i* and the most significant bit in stage 8*i*. At each counter 44*i* the signals the forward count and backward count inputs are respectively constituted by the logical product of P2 and the output of a circuit 59*i* and as the logical product of P5 and the output of the circuit 59*i*, these products being formed by the AND circuits 60*i* and 61*i*.

The circuit 59*i* processes the bits contained in the cells 1*i* to 8*i*. The stages 4*i* to 8*i* of each counter 44*i* can also be used as a shift register and, to this end, the stage 4*i* is provided with a shift input 45*i*. A signal *t*, the logical product of the synchronizing signal *c* and the SET output *z* of a flip-flop 63*i*, is supplied to the input 45. This logical product is formed by an AND circuit 64*i*. The flip-flop 63*i* is put into the SET state by the end-of-character signal FC and is put into the RESET state by the signal p indicating that all the stages 4*i* to 8*i* contain 0. The bit H7*i* contained in the stage 7*i* passes through an AND gate 66*i* to an inverter 67*i*; the output of the inverter 67*i* passes through a gate 68*i* to the SET input of a flip-flop 69*i* normally in the RESET state. The signal H8*i*, which indicates the presence of a 1 bit in the stage 8*i* , passes through an inverter 71*i*, giving rise to the signal $\overline{\text{H8}i}$. The AND gate 66*i* is opened by $\overline{\text{H8}i}$ and a signal RES*i* corresponding to the RESET output of the flip-flop 69*i*. The AND gates 68A to 68E are opened by the signa ${}^{5}\text{OR}_{i=1}$ (H7*i*), in which H7*i* indicates that the stage 7*i* of the counter 44*i* contains the 1 bit, and ${}^{5}\text{OR}_{i=1}$ (H7*i*) indicates the logical sum of H7*i* for *i* ranging from 1 to 5. The signal RES*i* and the signal $\overline{\text{H8i}}$ pass to a logical product circuit 72*i* which supplies as output a signal H'01*i*. The signal H'01*i* commands the SET input of a flip-flop 73*i*, at the SET output of which there is obtained a signal H01*i*.

At the beginning of the count of P2 and P5, the eight stages of the counters 44A to 44E all contain a 1 bit. This configuration represents the decimal number 255 in the binary system.

Each pulse P2 which appears at the input of a counter 44*i* causes the count to proceed in the sense 255 0 1 2 . . . 126 127; each pulse P5 at the input of a counter 44*i*, on the other hand, causes the count to go back in the sense 255 254 253 . . . 127 128. For $+127 < P2 - P5 < -127$, the stage 58*i* of the counter 44*i* indicates the sign of $\Sigma P2 - \Sigma P5$: in fact, if this stage contains a 1 bit, the counter has a content higher than or equal to 128, which signifies that $\Sigma P2 - \Sigma P5 \leq 0$; if this stage contains a 0 bit, the counter has a content of less than 128 and therefore $\Sigma P2 - \Sigma P5 > 0$. It will be seen that by means of the indication of the stage 58*i* it is possible to discriminate the thresholds which give rise to negative values of $\Sigma P2 - \Sigma P5$ which, as has been seen, correspond to characters greatly enlarged by the quantization. Since the indication of the stage 8*i* has meaning only when $+127 < (\Sigma P2 - \Sigma P5) < -127$, the circuit 59*i* inhibits further forward counts when the counter 44*i* contains 127 and inhibits further backward counts when the same counter contains 128. A circuit which produces a behavior of this kind can easily be constructed by an average expert and a description thereof is therefore omitted. When the end-of-character signal FC appears, the bits of equal weight contained in the counters 44A to 44E are compared with one another starting from those contained in the stages 7*i* the bits contained in the various stages being shifted little by little to the right by means of the shift signal *t; t* has the frequency of the synchronizing signal *c* when the gate 64*i* is opened by the output of the flip-flop 63*i*. Let it be assumed, for example, that the bit contained in the stage 7*j* at the beginning of the comparison is 1 (that is H7*j* = 1) and that H8*j* = 0, while H7*i* = 0 for i ≠ j. In this case, the indicators 73A to 73E must indicate a maximum content for the counter 44*j*. For the counters in which H8*i* = 0, and therefore $\overline{\text{H8}i}$ = 1, the gates 66*i* are opened (it has been stated that the flip-flops 69*i* are normally in the RESET state) and allow H7*i* to pass. For the counter 44*j*, there is the passage of a bit H7*j* = 1 which, inverted by means of the inverter 67*j*, passes through the gate 68*j*. This gate is in fact open, since ${}^{5}\text{OR}_{i=1}$ H7*i* = 1; there is therefore a 0 bit at the SET input of the flip-flop 69*j*, which leaves it in the RESET state. Since RES*j* = 1 and $\overline{\text{H8}j}$ = 1, H01*j* will be = 1.

For the counters 44$i$ with $i \neq j$ for which $H8i = 0$, $\overline{H8i} = 1$, there is the passage of a bit $H7i = 0$ through the corresponding gates 66$i$. The bit $H7i = 0$, inverted by means of the corresponding inverter 67$i$, passes through the corresponding gate 68$i$ and changes the corresponding flip-flop 69$i$ over to the SET state. Since $RESi = O$ and $\overline{H8i} = 1$, $H01i$ will be $= 0$. For the counters 44$i$ (with $i \neq j$) for which $H8i = 1$, $\overline{H8i} = 0$, the corresponding gates 66$i$ are closed and the corresponding flip-flops 69$i$ remain in the RESET state, but, since $\overline{H8i} = 0$ and $RESi = 1$, we have $H01i = 0$. In accordance with what has been said hereinbefore, $H01j$ will be $= 1$ and $H01i = 0$ for $i \neq j$. The signal $H01j$ puts into the SET state the respective flip-flop for which $H'01j = 1$ and $H'01i = 0$ for $i \neq j$.

When the shift signal $t$ appears, the bits contained in the stages 6$i$ of the counters 44$i$ are shifted forward by one place, forming the new bits $H7i$. For the counter 44$j$, whatever the value of the new bit $H7j$, the state $H'01j = 1$ of the respective flip-flop is maintained. For the counters 44$i$ with $i \neq j$ for which $H8i = 0$, the corresponding gates 66$i$ are closed, because $RESi = 0$ inasmuch as the corresponding flip-flops 69$i$ have been previously put into the SET state. Therefore, the same flip-flops 69$i$ are not changed over, and $H01i \neq$ 0. For the counters 44$i$ with $i \neq j$ for which $H8i = 1$, the corresponding gates 66$i$ are closed, because $\overline{H8i} = 0$. Therefore, for these same counters 44$i$, the flip-flops 69$i$ are not changed over, and $H01i \neq$ 0. The same discussion can be repeated for the successive bits.

Since, as has been seen, the shift does not concern the bits contained in the stages 1$i$ to 3$i$, the comparison of the contents of the counters 44A to 44E is effected without the last three least significant bits; consequently, there can also be considered as good two thresholds for which $Np2 + Np3 + Np4$ is equal to less than 7, for the purpose of not excluding a threshold which is really good for one which might only apparently be so, on account of a series of irregularities which mutually compensate one another.

The outputs H01A to H01E of the best threshold indicators 47 go to a combining circuit 74 (FIG. 1) with five outputs UA to UE defined by the following equations (VII)

$$UA = H01A$$
$$UB = H01B \cdot \overline{H01A}$$
$$UC = H01C \cdot \overline{H01B} \cdot \overline{H01A} \qquad \text{(VII)}$$
$$UD = H01D \cdot \overline{H01C} \cdot \overline{H01B} \cdot \overline{H01A}$$
$$UE = H01E \cdot \overline{H01D} \cdot \overline{H01C} \cdot \overline{H01B} \cdot \overline{H01A}$$

From the Equations (VII) it can be deduced that $Uj$ will be $= 1$ for the first flip-flop 73$j$ (in the order extending from A to E) for which $H01j =$ 1, while $Ui$ will be $= 0$ for each $i \neq j$.

The principle on which one of the five registers 24A to 24E is selected for the successive processing operations is as follows. For the first character to be recognized, the connection of one of the registers 24A to 24E to the following circuits is imposed from outside. For each character following the first, the register corresponding to the threshold with which the character recognized immediately before has been quantized is selected. If the processor effects recognition of the character in this way, examination of the following character is proceeded with; if the character is not recognized, there is an output S from the logical product circuit 33 which goes to the scanning circuit 16, modifying the programme thereof in such manner as to effect a jump backwards as far as the beginning of the unrecognized character and recommence the scanning. This time, however, there will be operated on that register 24$i$ which corresponds to the signal $Bi$ quantized with the first, in the order from A to E, of the thresholds recognized as best during the examination previously effected. If the character is still not recognized, examination of the matrix corresponding to the signal $bi$ quantized with the possible second best threshold is proceeded with, and so on until the character is recognized or until the available best thresholds are exhausted.

The connection of one of the five registers 24A to 24E to the filter 28 is effected, in accordance with the procedure described before, by the logic network 27 (FIG. 1). This includes five AND gates 77A to 77E (which in reality should be regarded as multiplied for each of the connections which each of the registers 24A to 24E comprises). Each AND gate 77$i$ connects the corresponding register 24$i$ to an OR circuit 93, which in turn connects the register 24$i$ to the logical filter 28. The OR circuit 93 must also in reality be regarded as multiplied for each of the connections which each register 24$i$ comprises.

Each AND gate 77$i$ is opened by a signal $Bi$ obtained as the logical sum of three signals $Ti$, $Mi$, $Li$ by means of an OR circuit 78$i$. The signal $Ti$ is obtained in turn as the logical product of the signal $Ui$ and the signal RIL by means of an AND circuit 79$i$.

The signal $Mi$ can be selected externally. The signal $Li$ is obtained as the logical product of a signal $Ei$ and a signal $\overline{RIL}$ by means of an AND circuit 91$i$. The signals $Ei$ are obtained as SET outputs of a register 92 consisting of flip-flops in which the signals BA to BE drive the SET inputs. The outputs of the AND gates 77A to 77E go to a logical sum circuit 93, the output of which goes to the logical filter 28.

For the first character of a document, the connection of one of the registers 24A to 24E is imposed from outside by selecting one of the signals MA to ME; $Bj = 1$ is then obtained as output from the selected OR circuit 78$j$ and the respective gate 77$j$ is opened, producing the desired connection. Correspondingly, in the register 92 we have $Ej = 1$ and $Ei = 0$ for $i \neq j$, to indicate that the register connected to the filter is the register 24$j$. If, with the connection made, the character is recognized by the processor 31, we have $S = C$ at the end of the character and the scanning continues unchanged for the following character. The flip-flop 30 delivers an output $\overline{RIL}$ to indicate that the following character is being read for the first time. Since now $\overline{RIL} = 1$ and $Ej = 1$, we have $Lj = 1$ as output from the AND circuit 91$j$; we also have $Bj = 1$ at the output of the OR circuit 78$j$ and the respective gate 77$j$ is kept open, maintaining the connection with the filter 28 for the matrix 24$j$ which has enabled the preceding character to be recognized. During the reading of the character, the optimum thresholds for that character are calculated, these being indicated by the register 47; for example, let there be indicated two optimum or best thresholds, that is let H01$m$ = 1 and H01$n$ = 1, with $m$ preceding $n$ in the order extending from A to E. If, at the end of the examination of the character (that is for $FC = 1$), the character is recognized by the processor 31 (that is R = 1), then S = 0, $\overline{RIL} = 1$ and the connection remains unchanged for the following character. If, on the other hand, at the end of the examination of the character, it is not recognized by the processor 31, that is if, for FC = 1, R = 0, then a pulse $S = 1$ is obtained and acts on the scanning circuits 16, commanding a jump back to the beginning of the unrecognized character and a fresh scanning. Now RIL = 1, $\overline{RIL} = 0$ at the output of the flip-flop 30, to indicate that a character is being re-read. Since $\overline{RIL} = 0$, L$i$ = 0 for each $i$. The signal S brings all the flip-flops of the register 92 back to the RESET state. At the output of the circuit 74, U$m$ = 1 and U$i$ = 0 for each $i \neq m$. A signal T$m$ is therefore obtained at the output of the AND circuit 79$m$ and a signal B$m$ at the output of the corresponding OR circuit 78$m$, which opens the gate 77$m$. The register 24$m$ is therefore connected to the filter 28. The output E$m$ = 1 from the stores the connection made.

At the end of the examination of the character, the flip-flop 73$m$ of the register 47 is brought back to the RESET state; the register 47 then indicates H01$n$ = 1 and H01$i$ = 0 for each $i \neq n$.

If the character is recognized, the examination of the following character is proceeded with and, since E$m$ = 1, the connection of the matrix 24$m$ to the filter 28 is maintained. The register 47 is put into the RESET state. If, on the other hand, the character is not yet recognized, it is examined again by connecting the matrix 24$n$, corresponding to the second best, or optimum, threshold, to the filter 28. In fact, since U$n$ = 1, then T$n$ = 1, B$n$ = 1, so that the AND gate 77$n$ is opened. The process is repeated similarly for the successive characters.

The re-examination of a character with the same threshold can be effected more than once. To do this, it is sufficient for the flip-flop 73$m$ of the register 47 corresponding to a best threshold not to be brought back into the RESET state at the end of the examination of the character quantized with the same best threshold, but after a predetermined number of examinations of the character quantized with the same best threshold. This can be done in various ways well known to the average expert.

The register 24$i$, however selected, is connected to the logical filter 28. This is a combinatory circuit which processes the bits contained in the register 24$i$ and which gives a one output if for these bits there is satisfied at least one of the conditions A′ together with at least one of the conditions B indicated diagrammatically in FIG. 6, or if one of the conditions A″ is satisfied.

Figure 6:
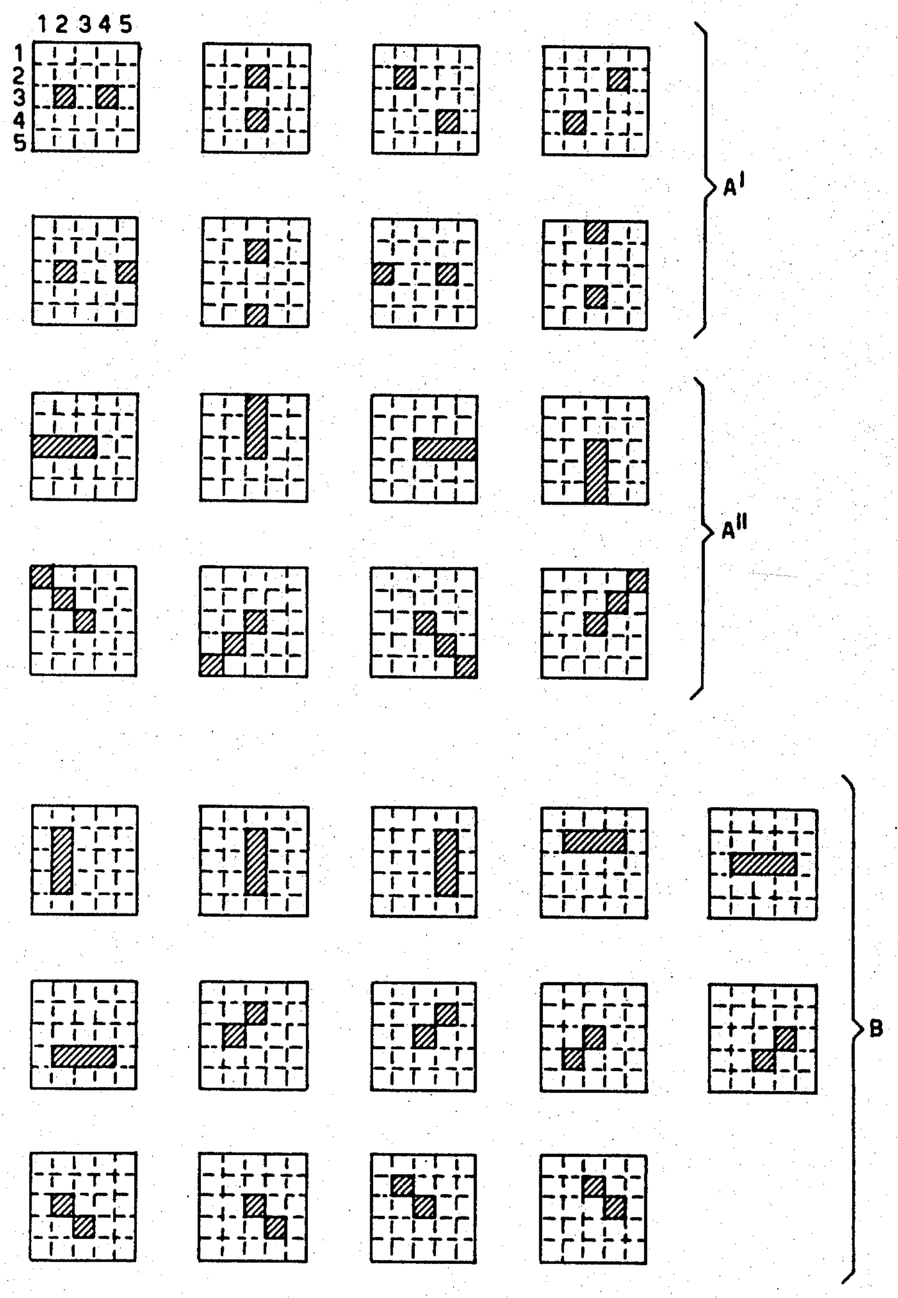
FIG. 6 is a diagram demonstrating a procedure utilized by the apparatus.

In the diagram of FIG. 6, the 25 boxes or compartments of each matrix correspond to the flip-flops (U, V)$i$ of the register 24$i$; a black box indicates that the corresponding flip-flop in the register 24$i$ contains a 1 bit, a white box indicates that the corresponding flip-flop may contain either a 1 bit or a 0 bit. Because of the correspondence existing between bits contained in the register 24$i$ and points of the character 17, it can be said that the logical filter 28 assigns to a point corresponding to the bit contained in the cell (3,3)$i$ of the register 24$i$ a value (zero or one) according to whether or not there is satisfied for the surrounding points at least one of the conditions A″ together with at least one of the conditions B or at least one of the conditions A′. For example, the first of the conditions A′ represented in FIG. 6 may be translated into equations in the following manner:

$$\text{1st condition A}' = (3,2) \cdot (3,4)$$

The following conditions can be represented similarly. Therefore, if we refer to the output signal from the circuit 28 as $h$, the total equation of said circuit will be:

$$h = [\text{OR (conditions A}'')] \text{ AND } [\text{OR (conditions B)}] \text{ OR (conditions A}')$$

The occurrence of one of the conditions A′ signifies that, with every probability, the white point corresponding to the center of the matrix is such because of a break in a horizontal, vertical or oblique portion of a line. A break of this kind is eliminated by declaring the point in question black. Thus, the conditions A″ indicate that the black central point is the end of a line portion, while the conditions B indicate that the central point forms part of a connected group or assembly of black points. It can also be said that the conditions A′ fill in the breaks or gaps in these portions, the conditions A″ maintain the ends of the portions and the conditions B maintain the connection with the surrounding points.

The circuit 28 can easily be produced by an average expert and the diagram thereof is therefore omitted. At the output of the filter 28 there will be obtained a signal $f$ representing the character 17, which signal eliminates, with respect to the selected signal $bi$, a good part of the irregularities present in the printed character, rendering recognition thereof by the processor 31 easier.

Figure 4:
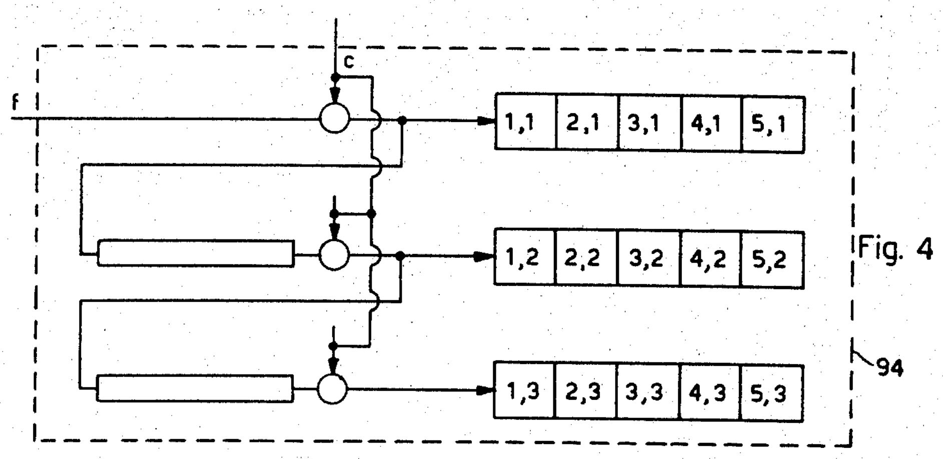
FIG. 4 is another detail of FIG. 1.
Figure 7:
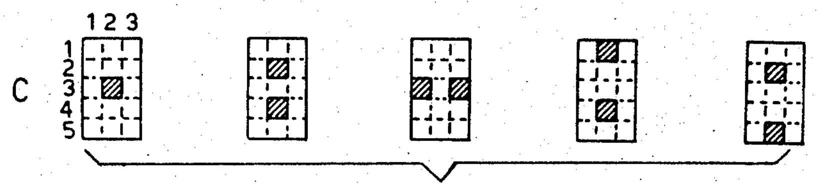
FIG. 7 is a diagram demonstrating another procedure utilized by the apparatus.

The signal $f$ is furthermore parallelized in a register 94 (FIG. 4) comprising 15 flip-flops U′, V′ and operating like the registers 24A to 24E hereinbefore described. The bits contained in the register 94 are then processed by a combining circuit 95 which, in a manner similar to that hereinbefore described for the circuit 28, assigns to a bit contained in the flip-flop 3′, 3′ a 1 value if the conditions C shown diagrammatically in FIG. 7 are satisfied together. The effect of this second filtering is to eliminate vertical breaks smaller than three points and horizontal breaks smaller than two points. The output of the circuit 95 constitutes a signal $h$ which goes to the recognition processor 31.

What we claim is:

1. Apparatus for recognizing graphic symbols comprising means for scanning each of the symbols with a succession of substantially parallel scans along a plurality of parallel lines to derive an analog electrical signal which is a function of the symbol density, and means for establishing a correspondence between each symbol examined and one of a set of predetermined graphic symbols and supplying a recognition-effected signal at the end of the examination and recognition of a symbol, the apparatus further comprising first means for quantizing the analogue signal derived from a first symbol with at least two thresholds of different values to produce corresponding digital signals, second means for indicating by the digital signal corresponding to the threshold for each symbol examined one or more best of said different valued thresholds corresponding to a maximum number of portions of the lines forming the symbol having a thickness approximating the average thickness for the type of symbols examined, said second means comprising at least two counting circuits, one of said counting circuits operating on each of the digital signals, each of said circuits counting the line portions of the symbol having a thickness approximating the average thickness for the type of symbols examined, and means responsive to the counting circuits to indicate the digital signal or signals having a maximum number of portions of a thickness approximating to the average thickness; third means for selecting for recognition one of the digital signals derived by said first means from said first symbol in correspondence with a best threshold indicated for a previously recognized symbol; and fourth means controlled by the means for supplying the recognition-effected signal for commanding a re-examination of an unrecognized symbol by selecting one of the digital signals corresponding to said best different valued thresholds indicated during the scan of said first symbol.

2. Apparatus according to claim 1, wherein each of said counting circuits comprises a reversible counter.

3. Apparatus according to claim 2, wherein said second means includes comparison means coupled to said counters to compare with one another bits comprising each of said digital signals contained in the counters starting from the most significant place, the result of the comparison being stored in the indicator means 4. Apparatus according to claim 3, wherein the comparison of the bits in the counters is effected at a fixed significant place in each of the counters, and including means for causing the bits contained in the other places to shift in turn into the fixed place.

5. Apparatus according to claim 3, wherein the comparison of the bits in the counters is only effected on a given number of most significant places of said other places.

6. Apparatus according to claim 1, wherein the indication corresponding to the best threshold is cancelled at each re-examination of the character effected with this threshold as ordered by said fourth means.

7. Apparatus according to claim 1, wherein the indication corresponding to the best threshold is cancelled after a predetermined number of re-examinations of the character effected with this threshold as ordered by said fourth means.

8. Apparatus for recognizing graphic symbols comprising means for scanning each of the symbols with a succession of substantially parallel scans along a plurality of parallel lines to derive an analog electrical signal which is a function of the symbol density, and means for establishing a correspondence between each symbol examined and one of a set of predetermined graphic symbols and supplying a recognition-effected signal at the end of the examination and recognition of a symbol, the apparatus further comprising first means for quantizing the analogue signal derived from a first symbol with at least two thresholds of different values to produce corresponding digital signals; second means for indicating by the digital signal corresponding to the threshold for each symbol examined one or more best of said different valued thresholds corresponding to a maximum number of portions of the lines forming the symbol having a thickness approximating the average thickness for the type of symbols examined said second means comprising, with respect to each of said digital signals, a register to staticize a group of electrical pulses obtained by sampling the digital signal, said electrical pulses corresponding to an area including a predetermined point, means for generating timing signals to shift the contents of the register so as to contain therein successively the signals for a plurality of areas encompassing all points of the symbol, and a logic circuit responsive to the register to indicate the line thickness associated with the predetermined point of each of said areas; third means for selecting for recognition one of the digital signals derived by said first means from said first symbol in correspondence with a best threshold indicated for a previously recognized symbol; and fourth means controlled by the means for supplying the recognition-effected signal for commanding a re-examination of an unrecognized symbol by selecting one of the digital signals corresponding to said best different valued thresholds indicated during the scan of said first symbol.

9. Apparatus according to claim 8, wherein the logic circuit includes means responsive to each of said digital signals for assigning to each predetermined point an integer indicating the line thickness, which integer is the number of points in the side of the largest square which has the predetermined point as a predetermined vertex thereof and which is completely filled with points indicated as being denser than the threshold by the digital signal.

10. Apparatus according to claim 9, wherein said second means comprise at least two counting circuits, one of said counting circuits operating on each of the digital signals, each of said circuits counting the line portions of the symbol having a thickness approximately the average thickness for the type of symbols examined, and means responsive to the counting circuits to indicate the digital signal or signals having a maximum number of portions of a thickness approximating to the average thickness, and wherein each of the counting circuits is arranged to count the number of times that the said integer assumes a predetermined maximum value less the number of times that the integer assumes a predetermined smaller value the counter having the highest count thereby fixing the best threshold, the remaining best thresholds being in order according to the count in the counter.

* * * * *